United States Patent [19]

Toki et al.

[11] Patent Number: 5,504,185
[45] Date of Patent: Apr. 2, 1996

[54] PROCESS FOR PRODUCTION OF POLYAMIDES, POLYAMIDES PRODUCED BY SAID PROCESS AND POLYAMIDE FILM OR SHEET

[75] Inventors: Tsukasa Toki, Niigata; Masahiro Harada; Yasuo Inaba, both of Hiratsuka, all of Japan

[73] Assignee: Mitsubishi Gas Chemical Company, Inc., Tokyo, Japan

[21] Appl. No.: 141,593

[22] Filed: Oct. 27, 1993

[30] Foreign Application Priority Data

Nov. 2, 1992 [JP] Japan .................. 4-294415
Jul. 20, 1993 [JP] Japan .................. 5-179247

[51] Int. Cl.$^6$ .................. C08G 69/26; C08G 69/28
[52] U.S. Cl. .................. 528/336; 528/335; 528/347
[58] Field of Search .................. 528/335, 336, 528/347

[56] References Cited

U.S. PATENT DOCUMENTS

| | | | |
|---|---|---|---|
| 4,185,150 | 1/1980 | Kuceski | 528/336 |
| 4,352,926 | 10/1982 | Matsuoka et al. | 528/335 |
| 4,375,552 | 3/1983 | Kuceski | 560/204 |
| 4,640,976 | 2/1987 | Curatolo et al. | 528/336 |
| 4,719,284 | 1/1988 | Nielinger et al. | 528/335 |
| 4,760,129 | 7/1988 | Haering et al. | 528/481 |

FOREIGN PATENT DOCUMENTS

| | | |
|---|---|---|
| 0210511 | 2/1987 | European Pat. Off. . |
| 3605202 | 2/1987 | Germany . |

OTHER PUBLICATIONS

Database WPI, Week 7452, Derwent Publications Ltd., London, GB; AN 74–89316V & JP–A–49 053 945 (Toyobo Co) 25 May 1974.

*Primary Examiner*—Ana L. Carrillo
*Attorney, Agent, or Firm*—Wenderoth, Lind & Ponack

[57] ABSTRACT

A process for the production of a polyamide, which comprises polycondensing adipic acid prepared by nitric acid oxidation and containing 1 ppm by weight or less of a free mineral acid as an impurity with a diamine represented by formula (1)

$$H_2N-CH_2-R-CH_2-NH_2 \ldots \quad (1)$$

wherein R denotes a linear or branched alkylene group having 2 to 10 carbon atoms, a m-phenylene group, a p-phenylene group, a 1,3-cyclohexylene group or a 1,4-cyclohexylene group; a polyamide produced by said process; and a film or sheet made of the above polyamide.

6 Claims, No Drawings

PROCESS FOR PRODUCTION OF POLYAMIDES, POLYAMIDES PRODUCED BY SAID PROCESS AND POLYAMIDE FILM OR SHEET

BACKGROUND OF THE INVENTION

1. Field of the Invention

This invention relates to a process for the production of a polyamide containing smaller amounts of gel-like substances, a polyamide which is produced by this process, and a film or sheet made of the polyamide.

2. Prior Art

As a general process for producing a high-molecular-weight polyamide using adipic acid as a dicarboxylic acid component, there are a process in which an aqueous solution of a salt of adipic acid and a diamine is formed and heated under increased pressure, and polycondensation is conducted while removing water formed, and a process in which adipic acid is heat-melted to form an adipic acid solution, and while adding dropwise a diamine to the adipic acid solution, polycondensation is conducted by removing water formed.

The above adipic acid as a starting material to produce the polyamide is industrially prepared by oxidizing cyclohexanol or a mixture (KA oil) of cyclohexanone and cyclohexanol with nitric acid.

Crude adipic acid obtained by nitric acid oxidation is purified by washing with water. The thus obtained adipic acid as a product contains 4 to 10 ppm by weight of free nitric acid. Said adipic acid sometimes contains other mineral acid used together with nitric acid in the nitric acid oxidation, e.g., hydrochloric acid, in a free form in an amount of 4 to 10 ppm based on the total amount of it and nitric acid.

SUMMARY OF THE INVENTION

The present inventors have found that large amounts of gel-like substances which are called fish-eye in some case are present in a polyamide produced by the above process using as a starting material adipic acid prepared by nitric acid oxidation and containing free mineral acid in the above concentration, as well as in a film made of such polyamide.

According to further findings of the present inventors, the gel-like substances cause a film to be broken in producing a biaxially oriented polyamide film by biaxially stretching an unstretched film. This decreases the commercial value of the polyamide. Moreover, the gel-like substances, when present in the polyamide film, impair the appearance of the film and decrease its commercial value.

It is an object of this invention, therefore, to provide a process for the production of a polyamide containing smaller amounts of gel-like substances and having a higher commercial value by using as a starting material adipic acid prepared by nitric acid oxidation.

Another object of this invention is to provide a polyamide containing smaller amounts of gel-like substances and having a higher commercial value, which polyamide is produced by the above process.

Still another object of this invention is to provide an unstretched film or sheet made of the above polyamide, containing smaller amounts of gel-like substances and less likely to cause breakage even when stretched.

A further object of this invention is to provide an unstretched or stretched film or sheet made of the above polyamide, containing smaller amounts of gel-like substances and not impairing film appearance.

In accordance with this invention, there is first provided a process for the production of a polyamide, which comprises polycondensing adipic acid prepared by nitric acid oxidation and containing 1 ppm by weight or less of a free mineral acid as an impurity with a diamine represented by formula (1)

$$H_2N-CH_2-R-CH_2-NH_2 \ldots \qquad (1)$$

wherein R denotes a linear or branched alkylene group having 2 to 10 carbon atoms, a m-phenylene group, a p-phenylene group, a 1,3-cyclohexylene group or a 1,4-cyclohexylene group.

In accordance with this invention, there is secondly provided a polyamide produced by the above process.

In accordance with this invention, there is thirdly provided a film or a sheet made of the above polyamide.

The aforesaid objects of this invention are achieved by these inventions.

The inferred reason why the amount of the gel-like substance present in the produced polyamide is reduced by restricting 1 ppm or less the amount of the free mineral acid in adipic acid prepared by the nitric acid oxidation to produce the polyamide will be described below.

That is, it is inferred that the free mineral acid present in adipic acid in an amount of 4 to 10 ppm promotes a crosslinking reaction in the polycondensation reaction of adipic acid with the diamine, resulting in formation of large amounts of gel-like substances in the polyamide, and that when the free mineral acid is present in an amount of 1 ppm or less, the crosslinking reaction is suppressed to decrease the amounts of the gel-like substances in the polyamide.

This invention will be described in more detail below, and the other objects and advantages of this invention can thereby be understood.

DETAILED DESCRIPTION OF THE INVENTION

Adipic acid used in this invention is prepared by oxidizing cyclohexanol or a mixture of cyclohexanone and cyclonexanol with nitric acid in the presence of a catalyst such as mercury sulfate, ammonium vanadate or a copper salt, and contains 1 ppm by weight or less, preferably 0.8 ppm by weight or less, of free mineral acid.

Examples of the mineral acid contained in adipic acid produced by nitric acid oxidation are mineral acids used in nitric acid oxidation, such as nitric acid, hydrochloric acid, sulfuric acid and boric acid.

The free mineral acid in this invention means a mineral acid not forming a salt or/and a mineral acid forming a salt with an amine. Regarding the mineral acid that forms the salt with the amine, the amount of the free mineral acid is calculated on condition that said mineral acid does not form the salt.

Adipic acid prepared by nitric acid oxidation is commercially available. The commercially available adipic acid, however, generally contains 4 to 10 ppm by weight of the free mineral acid. When such commercially available adipic acid is used as a starting material to produce the polyamide, therefore, a step to reduce the amount of the free mineral acid to 1 ppm or less is carried out.

As the method to reduce the amount of the free mineral acid in adipic acid, a method can be taken in which an alkali metal compound or an alkaline earth metal compound is added to adipic acid to convert the free mineral acid into an alkali metal salt or an alkaline earth metal salt.

Examples of the alkali metal compound are alkali metal hydroxides such as sodium hydroxide, potassium hydroxide and lithium hydroxide, alkali metal salts of organic carboxylic acids such as sodium formate, potassium formate, sodium acetate and potassium acetate, sodium hydrogencarbonate and sodium carbonate. Of these, sodium hydroxide and sodium acetate are preferable.

Examples of the alkaline earth metal compound include calcium hydroxide and magnesium hydroxide.

These alkali metal compounds and alkaline earth metal compounds can be used either singly or in combination.

Another method to reduce the amount of the free mineral acid in adipic acid is a method in which commercially available adipic acid is repeatedly vigorously washed with water.

The diamine to be polycondensed with adipic acid is the diamine of formula (1). Specific examples of the diamine are $\alpha,\omega$-asphaltic diamines having 4 to 12 carbon atoms, such as tetramethylenediamine and hexamethylenediamine; m-xylylenediamine; p-xylylenediamine; 1,3-bisaminomethylcyclohexane; 1,4-bisaminomethylcyclohexane; and mixtures thereof.

According to this invention, the polyamide can be produced from adipic acid containing 1 ppm or less of the free mineral acid and the diamine by a method known per se, for example, a method in which an aqueous solution of a salt of adipic acid and the diamine is prepared and heated under increased pressure, and polycondensation is conducted while removing water formed, or a method in which adipic acid is heat-melted to form an adipic acid solution, and while adding dropwise a diamine to the adipic acid solution, polycondensation is conducted by removing water formed.

A relative viscosity (measured at 25° C. in a 96% conc. sulfuric acid solution in a concentration of 1 g/100 ml) of the polyamide obtained by the above method is about 1.6 to 4.5.

A higher-molecular-weight polyamide can be obtained by conducting the polycondensation upon making the polycondensation time longer, or decreasing, to a greater extent, and water vapor pressure of and gaseous phase which is in contact with the molten polyamide, or by, after the above polycondensation, once pelletizing the product, heating the pellets under reduced pressure, and conducting polymerization in a solid phase. In this manner, the higher-molecular-weight polyamide having the relative viscosity of about 2 to 7.5 can be produced.

In order to prevent coloring of the polyamide in the polycondensation, it is possible to add a coloring-preventing agent such as a hindered phenol, a hindered amine, phosphorous acid, hypophosphorous acid, or their salts and esters.

The thus obtained polyamide of this invention contains smaller amounts of gel-like substances.

An unstretched or stretched film or sheet can be prepared from the polyamide of this invention, preferably the relatively higher-molecular-weight polyamide having the relative viscosity of 2.0 to 7.5, by a method known per se. For instance, the unstretched film or sheet can be prepared from the polyamide of this invention by melt-extrusion. Further, a biaxially oriented film or sheet can be produced by biaxially stretching the unstretched film or sheet stably without trouble such as breaking of the film or sheet. Still further, a biaxially oriented film can be prepared by forming a tube with an extruder equipped with a cylindrical die and blowing a gas, e.g., air into the tube. In this tube-making, such a trouble that the tube breaks at the air-blowing step hardly occurs.

In the film or sheet made of the polyamide of this invention, the number of the gel-like substances each having a size of 50 μm or more is as small as 1,500 pieces/m$^2$ or less. Accordingly, the film or sheet can have excellent appearance.

The unstretched or stretched film or sheet made of the polyamide of this invention has usually a thickness of 3 to 3,000 μm or more, and can be suitably used for the ordinary usage of the polyamide film.

The following Examples and Comparative Example illustrate this invention specifically.

The relative viscosity and the number of gel-like substances shown in the Examples were measured by the following methods.

(1) Relative viscosity:

A polyamide sample was measured for its relative viscosity at 25° C. in a 96% conc. sulfuric acid as a mesuring solvent in a concentration of 1 g/100 ml.

(2) Number of gel-like substances:

Using a magnifying projector, a 100 mm-square portion of an unstretched film was magnified and projected. The numbers of gel-like substances having a size of at least 50 μm but less than 100 μm, a size of at least 100 μm but less than 200 μm, and a size of at least 200 μm were measured with an unaided eye.

In this measurement, the largest diameter of the gel-like substance was made the size thereof.

Example 1

Adipic acid (10 kg, 68.4 mols) prepared by nitric acid oxidation and containing 0.6 ppm of free nitric acid was charged into a 50-liter stainless steel reaction vessel, and melted under heating at 170° C. After the heat-melting, 9.3 kg (68.4 mols) of m-xylylenediamine was gradually added dropwise, and the inner temperature was raised to 240° C. The time of the dropwise addition was 2.5 hours.

After the addition, the temperature inside the reaction vessel was raised to 260° C., and the reaction continued at 260° C. for 20 minutes. At this temperature elevation, when the temperature reached 250° C., the pressure inside the reaction vessel was reduced. After the reaction was terminated, the pressure inside the reaction vessel was increased slightly above atmospheric pressure with nitrogen, and strands were extruded from a die head having 5 holes and pelletized with a pelletizer.

The obtained pellets were charged into a 150-liter tumbler, and polymerization was carried out in a solid phase at 205° C. under reduced pressure for 2 hours. The resulting poly-m-xylylene adipamide had a relative viscosity of 3.70 and a number average molecular weight of 42,000.

The poly-m-xylylene adipamide was extruded with an extruder equipped with a T-die to form a 50 μm-thick film.

The number of gel-like substances in the obtained film was measured with the result shown in Table 1.

A 300 μm-thick unstretched sheet was prepared in the same manner as above. The stretchability of this sheet was excellent, and a 20 μm-thick biaxially oriented film could be prepared from this sheet with a biaxial stretching machine without any trouble.

Example 2

Adipic acid (10 kg, 68.4 mols) prepared by nitric acid oxidation and containing 4 ppm of free nitric acid, 7.95 kg (68.4 mols) of hexamethylene-diamine, 3.0 g of sodium hydroxide and 10 kg of water were charged into a 50-liter stainless steel reaction vessel to form an aqueous solution containing hexamethylene diammonium adipate (AH salt) dissolved therein. In the aqueous solution, free nitric acid was present in an amount of 0.3 ppm by weight based on the adipic acid charged.

Then, while taking care not to cause precipitation of the AH salt, the above aqueous solution was concentrated at 150° C. under slightly increased pressure until the concentration of the AH salt reached 80%.

Subsequently, the reaction vessel was closed, and heated until the temperature inside the reaction vessel reached 250° C., and the reaction was successively conducted at 250° C. under pressure of 15 atm for 2 hours.

Heating was further continued, and the pressure was returned to normal pressure while releasing the water vapor of the reaction vessel outside thereof, followed by increasing the temperature inside the reaction vessel to 280° C.

The reaction continued under normal pressure for 20 minutes, and melt-polymerization was terminated. The pressure inside the reaction vessel was then increased slightly above atmospheric pressure, and strands were extruded from a die head having 5 holes and pelletized with a pelletizer. The obtained pellets were charged into a 150-liter tumbler, and polymerization was performed in a solid phase at 200° C. under reduced pressure for 2 hours. The resulting polyhexamethylene adipamide had a relative viscosity of 4.5 and a number average molecular weight of 42,000.

Said polyhexamethylene adipamide was extruded with an extruder equipped with a T-die to produce a 50 μm-thick film.

The number of gel-like substances of the resulting film was measured with the result shown in Table 1.

Further, a 300 μm-thick unstretched sheet was prepared in the same way as above. The stretchability of this sheet was excellent, and a 20 μm-thick biaxially oriented film could be prepared from this sheet with a biaxial stretching machine without any trouble.

Example 3

Adipic acid (10 kg, 68.4 mols) containing 2.6 ppm of free nitric acid and 3.4 g of sodium acetate were charged into a 50-liter stainless steel reaction vessel, and heated at 170° C. to melt adipic acid. In the molten adipic acid, free nitric acid was present in an amount of 0.5 ppm. In the same way as in Example 1, 9.3 kg (68.4 mols) of m-xylylenediamine was added, and melt-polymerization and polymerization in a solid phase were carried out. The resulting poly-m-xylylene adipamide had a relative viscosity of 3.70 and a number average molecular weigh of 42,000.

This polyamide was extruded from an extruder equipped with a T-die to prepare a 50 μm-thick film. The number of gel-like substances of the obtained film was measured with the result shown in Table 1.

A 300 μm-thick unstretched sheet was prepared in the same way as above. The stretchability of this sheet was excellent, and a 20 μm-thick biaxially oriented film could be prepared from this sheet with a biaxial stretching machine without any trouble.

Comparative Example 1

Example 3 was repeated except that sodium acetate was not added to produce poly-m-xylylene adipamide having a relative viscosity of 3.7 and a number average molecular weight of 42,000.

The number of gel-like substances of an unstretched T-die film made of this polyamide is shown in Table 1.

The stretchability of the unstretched sheet was poor compared to that of the sheet in Example 3.

At the time of stretching, four of ten sheets were broken. A large number of fish eyes considered to be attributable to the gel-like substances were observed on the surface of the stretched film which could be stretched without breakage, and the appearance of the stretched film was poor.

TABLE 1

| | Number of gel-like substances (pieces/m²) | | |
| --- | --- | --- | --- |
| | Gel size (μm) | | |
| | At least 200 | At least 100 but less than 200 | At least 50 but less than 100 |
| Example 1 | 40 | 170 | 1200 |
| Example 2 | 50 | 150 | 1100 |
| Example 3 | 45 | 200 | 1200 |
| Comparative Example 1 | 1500 | 11000 | 83000 |

From the results shown in Table 1, it is apparent that the polyamide film of this invention contains extremely small amounts of the gel-like substances.

What we claim is:

1. A process for the production of a polyamide, which comprises polycondensing adipic acid as a dibasic acid, said adipic acid being prepared by nitric acid oxidation and containing 0.6 ppm by weight or less of a free mineral acid as an impurity based on the weight of the adipic acid, with a diamine represented by formula (1)

$$H_2N\text{---}CH_2\text{---}R\text{---}CH_2\text{---}NH_2 \ldots \quad (1)$$

wherein R denotes a linear or branched alkylene group having 2 to 10 carbon atoms, a m-phenylene group, a p-phenylene group, a 1,3-cyclohexylene group or a 1,4-cyclohexylene group.

2. The process of claim 1 wherein adipic acid containing 0.6 ppm by weight or less of the free mineral acid is formed by neutralizing adipic acid prepared by nitric acid oxidation with an alkali metal compound or an alkaline earth metal compound.

3. The process of claim 2 wherein the unneutralized adipic acid prepared by nitric acid oxidation contains the free mineral acid as an impurity in an amount exceeding 1 ppm by weight.

4. A polyamide produced by the process of claim 1.

5. The polyamide of claim 4 wherein a relative viscosity of the polyamide measured at 25° C. in a 96% conc. sulfuric acid solvent in a concentration of 1 g/100 ml is 1.6 to 7.5.

6. The process of claim 1 wherein the dibasic acid consists essentially of adipic acid.

* * * * *